Figure 1:
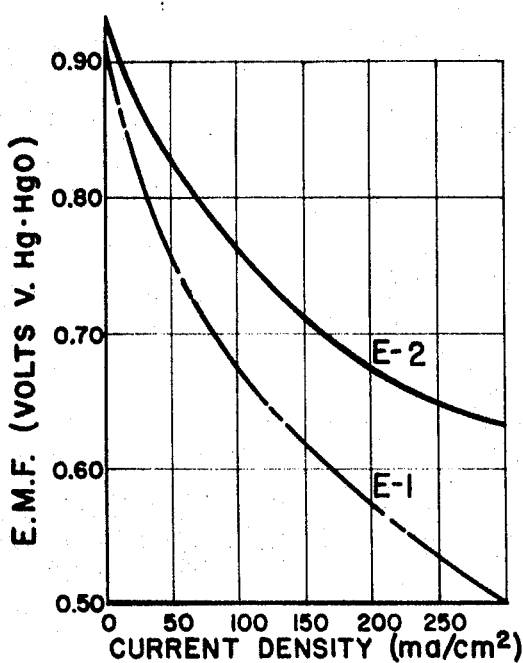

3,458,358
FUEL CELL ELECTRODE
John R. Thompson, Jr., Kane, Pa., assignor to Sun Oil
Company, Philadelphia, Pa., a corporation of New
Jersey
Filed Mar. 31, 1964, Ser. No. 356,233
Int. Cl. H01m 27/04, 13/00
U.S. Cl. 136—86                                4 Claims This invention relates to fuel cell catalyst electrodes and more particularly to a novel method for preparing fuel cell catalyst electrodes.

Catalyst electrodes for use in fuel cells, such as gas-diffusion electrodes, are known. These electrodes, combined with a second equal or different electrode in a suitable liquid electrolyte, can form a fuel cell for the economical chemical generation of electrical energy from combustible gases and an oxidizing agent, such as oxygen, air, or a halogen.

Since 1839 when Sir William Grove constructed what is considered to be the first fuel cell, research workers in this field have been striving to produce improved fuel cells and particularly improved fuel cell electrodes. An electrode which aroused considerable interest in the fuel cell field was developed by F. T. Bacon and is described by R. G. H. Watson in "Direct Current," vol. 1, pp. 30–34, 1952. This electrode consists of a thin nickel layer with narrow pores deposited on a thicker nickel plate having pores about twice as wide as the pores of the thin nickel layer. In operation, hydrogen is first passed through the wide pores with a loss of pressure of only about 10 mm. of mercury and displaces the electrolyte consisting of a potash solution from the wide pores. The hydrogen is then prevented from escaping unused in the form of small bubbles by the fine pored nickel layer. The fine pores offer a large surface area covered with a thin liquid layer to which a combustible gas may be passed by diffusion. The combustible gas is absorbed, probably with the formation of a metastable NiH compound, and is then displaced by the inflowing hydrogen and escapes in the form of H+ ions into the electrolyte, leaving behind one current-producing electron for each ion. In the electrolyte, the H+ ions combine OH− ions coming from the oxygen diffusion electrode forming water.

In order that this fuel cell produce a sufficiently high current density, it must be operated at a temperature of as high as 200° C. At this high temperature, however, the vapor pressure of the potash solution of electrolyte increases to about 28 atmospheres per square centimeter, causing extremely difficult problems in connection with the fuel cell construction. A severe corrosion problem exists, as even the noble metals will not resist the hot concentrated solution. The nickel electrode as described thus only has a life period of a few hours, so that fuel cells equipped with such electrodes, in spite of the high current density of about 330 milliamperes per square centimeter at a service voltage of 0.79 volt and an efficiency of 60% are not able to supply electric energy cheaper than by the usual indirect way via heat engines.

A subsequent development in the field of plate or disc type fuel cell electrodes was that of the double skeleton catalyst electrode as developed by E. Justi et al. and reported in "High-Drain Hydrogen-Diffusion-Electrode Operating at Ambient Temperature and Low Pressure," 1959, translated by Burton, Research Information Service, Division Pergamon International Corp. These electrodes are known as mono-layer double skeleton catalyst electrodes. These mono-layer electrodes show an unavoidable throughput of waste hydrogen which is not consumed electrochemically and hence the efficiency of gas consumption is diminished to about 15%.

Subsequently there was developed the double-layer double skeleton catalyst electrode which improved the efficiency of gas consumption over that of the mono-layer electrodes to more than 90%. These double-layer double skeleton catalyst electrodes are conventionally prepared by mixing various powder sizes of matrix material and a catalyst material. A die of a compression mold is filled first with a layer of fine grain powder mixture followed by a layer of coarser grain powder mixture. The layers are then compacted, sintered and activated in a conventional manner. The catalyst electrodes in final form thus have one surface layer having extremely fine porosity with the other of relatively greater porosity. While fuel cell electrodes fashioned in this manner operate with relatively high degrees of efficiency, present techniques for the preparation of such electrodes tend to produce a warping of the electrodes due to the fact that two different size powder mixtures must be used.

A method has now been found whereby fuel cell catalyst electrodes can be prepared which electrodes posses a high degree of operating efficiency and do not posses any of the disadvantages of such electrodes as described above.

Briefly stated the method of this invention comprises (a) subjecting a mixture of a powdered catalytically active material with a powdered matrix material to a pressure $P_1$ sufficient to effect a mechanical bonding of the powders and form a compacted mass containing relatively large interstices throughout said mass, (b) rapidly increasing the pressure $P_1$ to a second pressure $P_2$ having a value at least 5 percent greater than the initial pressure $P_1$, (c) maintaining the pressure $P_2$ on the compacted mass for a period of time sufficient to compress the outer portions of the mass adjacent surfaces normal to the pressure applied and form in said portions relatively small interstices, (d) releasing the pressure $P_2$ prior to the time the entire compacted mass contains uniform relatively small interstices throughout said mass, (e) sintering the compacted mass, and (f) contacting the sintered mass with an alkali leaching solution.

It is thus apparent from the description contained in the preceding paragraph that the electrodes produced in accordance wiith this invention are in the nature of a sandwich. That portion analogous to the pieces of bread being the outer portions containing the relatively small interstices whereas the portion of the electrode analogous to the filling in the sandwich is the middle portion containing the relatively large interstices.

The substance used as the matrix material can be selected from a wide variety of materials. The only real limitations imposed on the matrix material are that it must conduct electricity, be substantially inert to the electrolyte used in the particular fuel cell, i.e., concentrated basic solution or concentrated acid solution, and form a sinterable mixture with the catalyst material. Examples of suitable matrix materials include carbonyl nickel (an extremely pure commercial form of nickel prepared from nickel carbonyl), carbon iron (for use in caustic electrolyte), cobalt, carbon in a plastic binder, lead, titanium, silver, copper, manganese, and certain alloys such as Carpenters metal. The preferred matrix materials to be used in the process of this invention are carbonyl nickel and carbon.

The substance used as the catalyst material must have, in addition to the properties listed above with regard to the matrix material, the ability to hasten the conversion of hydrogen to hydrogen ions (when used as a fuel electrode) and the conversion of oxygen to hydroxyl ions (when used as the oxygen or air electrode). Examples of suitable catalyst materials include platinum, palladium, rhodium, Raney nickel, Raney palladium, Raney platinum, silver, gold, silver-zinc alloy, silver-palladium alloy, and nickel-silver alloy. The preferred catalyst materials to be used in the process of this invention are platinum, palladium, Raney nickel, Raney palladium, and Raney platinum. The Raney nickel, Raney palladium, and Raney platinum are conveniently prepared from the corresponding alloys.

The terms Raney nickel alloy, Raney palladium alloy, and Raney platinum alloy shall be understood to be alloys of the various metals with a catalytically inactive material such as aluminum, magnesium, or zinc. The catalytically inactive material must be capable of being dissolved out of the alloy by either strong base or strong acid. Particularly suitable alloys are those containing from 20–60 percent by weight of nickel, palladium, or platinum and 80–40 percent by weight aluminum.

Alternatively the fuel cell electrodes prepared in accordance with this invention can be prepared from the catalyst material alone and hence no matrix material is needed. Thus the relative amounts of catalyst material and matrix material used in preparing the electrodes can be in the range of at least 0.1 percent by weight catalyst material to 100 percent by weight catalyst material. Since, however, the catalyst material is usually far more expensive than the matrix material and since no technological benefits are realized from the use of an electrode composed entirely of catalyst material, it is preferred that the relative ratios of catalyst material to matrix material be in the range of 1:1 to 1:4 by weight with a ratio of 1:1 to 1:2 being the most preferred.

In a preferred embodiment, the preparation of the fuel cell electrodes in accordance with this invention is accomplished by finely pulverizing the materials serving as the matrix material and the catalyst material. The substance serving as the matrix material typically would have the following U.S. Sieve analysis:

| Mesh: | Percent |
| --- | --- |
| +200 | 0.20 |
| −200, +270 | 0.60 |
| −270, +325 | 3.30 |
| −325 | 95.90 |

The catalyst material has the following typical U.S. Sieve analysis:

| Mesh: | Percent |
| --- | --- |
| +200 | 11.60 |
| −200, +270 | 33.70 |
| −270, +325 | 18.00 |
| −325 | 36.70 |

The finely pulverized powdered materials are completely intermixed and subjected to an initial pressure sufficient to effect a mechanical bonding of the powders and form a compacted mass containing relatively large interstices throughout the mass. This initial pressure $P_1$ is of the order of magnitude of 10,000 to 35,000 p.s.i. This initial pressure is maintained on the mixture for a period of time of at least one minute and can range up to about 15 minutes.

After the application of the initial pressure $P_1$ the pressure is rapidly increased by an amount of at least 5 percent. Greater increases in pressure can be utilized provided the time of application is not too long. For example, a 100 percent increase is operable provided the time of application thereof is of sufficiently short duration. The second pressure $P_2$ is maintained on the compacted mixture for a relatively short period of time in the range of from 5 to 30 seconds. It will be understood that the application of the second pressure $P_2$ is for the purpose of compressing only the outer portions of the electrode adjacent surfaces normal to the pressure applied. Thus the greater the difference between $P_1$ and $P_2$, the shorter will be the time of application of $P_2$. For example, if $P_1$ is of the order of 20,000 p.s.i.g. and $P_2$ is 22,000 p.s.i.g. (an increase of 10%), the time of application of $P_2$ typically can be of the order of 20–25 seconds, whereas if $P_2$ is 25,000 p.s.i.g. (an increase of 25%) the time of application of $P_2$ typically can be of the order of 10–15 seconds. The pressure is thereafter released prior to the time the entire compacted mass contains uniform relatively small interstices throughout the mass. The compacted mass is then sintered and activated by conventional procedures. For example, the sintering is conducted at a temperature in the range of from 500° to 1000° C. and the activation is accomplished by treatment with concentrated (i.e., 6 N) potassium hydroxide.

This invention will be further understood by the following example taken in conjunction with the attached figures.

Example

A mixture of carbonyl nickel powder and Raney nickel alloy powder having a composition of 50 percent nickel and 50 percent aluminum was blended in a rotating drum for 30 hours. The carbonyl nickel powder had the following U.S. Sieve analysis:

| Mesh: | Percent |
| --- | --- |
| +200 | 0.20 |
| −200, +270 | 0.60 |
| −270, +325 | 3.30 |
| −325 | 95.90 |

The Raney nickel alloy powder had the following U.S. Sieve analysis:

| Mesh: | Percent |
| --- | --- |
| +200 | 11.60 |
| −200, +270 | 33.70 |
| −270, +325 | 18.00 |
| −325 | 36.70 |

The blending ratios of the powders was one part by weight Raney nickel alloy to two parts by weight carbonyl nickel.

The powder mixture was compacted into disc shaped electrodes using a stainless steel die. The initial powder thickness was 0.1875 inch (3/16″) for all specimens. A series of electrodes were fabricated by compacting at pressures of approximately 15,000 and 25,000 p.s.i.g. for two minutes. On certain of the electrodes the pressures were then increased to approximately 17,000 and 29,000 p.s.i.g. respectively and held at these pressures for 15 seconds. The compacting pressures were supplied by a 120,000 pound capacity Baldwin Tensile Testing Machine modified to provide compression loads.

Following compression, each electrode was individually sintered in a resistance wound furnace capable of handling various atmospheres. The electrodes were placed on graphite pedestals inside the furnace chamber and heated in an atmosphere of argon to a temperature of about 700° C. The atmosphere was changed to hydrogen and the electrodes were heated to a temperature of 775° C., ±5° C. for 30 minutes. The atmosphere was changed back to argon and the electrodes cooled to ambient temperature.

Following the sintering treatment the electrodes were weighed and the diameter and thickness of each was measured prior to activation. The activation procedure involves placing each electrode in about 100 ml. of 1 N potassium hydroxide solution for 24 hours. During the 24-hour period the potassium hydroxide solution was periodically replenished. After this period the specimens, while contained in the potassium hydroxide, were placed in a vacuum desiccator. Every two days the vacuum was released and the solutions replenished, after the which the desiccator was again evacuated. After a month of treatment with 1 N potassium hydroxide, the leaching solution was changed to a 27 percent potassium hydroxide solution. The same evacuation procedure was employed.

Activation continued until no further reaction occurred when fresh 27 percent potassium hydroxide was added.

After the activation process was completed the electrical characteristics of each electrode were determined. The electrodes were tested in a cell containing 27 percent potassium hydroxide solution as the electrolyte. The electrolyte was maintained at a temperature of 21° to 24° C. The electrode was first purged with hydrogen so that vigorous bubbling of hydrogen occurred through the electrolyte in order to remove electrolyte from the interstices of the electrode. The hydrogen pressure was then reduced to the point where no bubbling occurred. The reference electrode was Hg-HgO. The system was allowed to equilibrate at zero load until the theoretical E.M.F. of 0.93 volt was reached. The load was then increased and the electrical characteristics were determined for current densities of 0, 20, 50, 100, 200 and 285 milliamperes per square centimeter. The potential was allowed to equilibrate at each of the current densities prior to the taking of any measurements. At each of the current densities the E.M.F. was read on a vacuum tube voltmeter and recorded. The conditions of preparing the electrodes tested are shown in the table.

TABLE

| Electrode No. | Initial compacting pressure ($P_1$) (p.s.i.g.) | Time at ($P_1$) (min.) | Second compacting pressure ($P_2$) (p.s.i.g.) | Time at ($P_2$) (sec.) |
|---|---|---|---|---|
| E-1 | 15,076 | 2 | | |
| E-2 | 15,006 | 2 | 17,265 | 15 |
| E-3 | 25,012 | 2 | | |
| E-4 | 25,000 | 2 | 28,756 | 15 |

Figure 2:
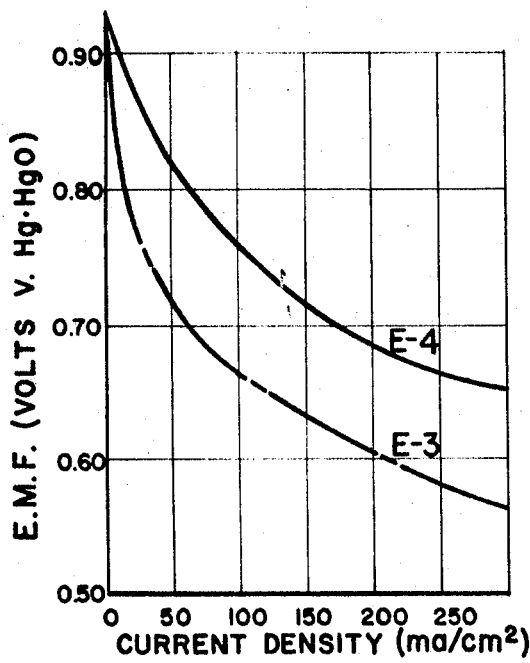

The performances of the electrodes prepared in accordance with the above description are shown in FIGURES 1 and 2. In FIGURE 1, electrode E-1 is compared with electrode E-2. It is readily apparent that E-2 is a superior electrode to E-1 in that it maintains a higher voltage at higher current densities. Similarly as shown in FIGURE 2, electrode E-4 is superior to electrode E-3.

Substantially analogous results are obtained when other of the matrix materials named above are substituted for carbonyl nickel and when other of the catalyst materials named above are substituted for the Raney nickel.

I claim:

1. Method for preparing fuel cell electrodes which comprises
    (a) subjecting a powdered catalytically active material to a pressure ($P_1$) sufficient to effect a mechanical bonding of the powdered material and form a compacted mass containing relatively large interstices throughout said mass,
    (b) rapidly increasing the pressure ($P_1$) to a second pressure ($P_2$) having a value of at least 5 percent greater than the initial pressure ($P_1$),
    (c) maintaining the pressure ($P_2$) on the compacted mass for a period of time sufficient to compress the outer portions of the mass adjacent surfaces normal to the pressure applied and form in said portions relatively small interstices,
    (d) releasing the pressure ($P_2$) prior to the time the entire compacted mass contains uniform relatively small interstices throughout said mass, and
    (e) using said electrode in a fuel cell.

2. Method in accordance with claim 1 wherein the initial pressure ($P_1$) is at least 10,000 p.s.i. for a period of time in the range of 1–15 minutes and wherein the second pressure ($P_2$) is at least 5 percent greater than $P_1$ for a period of time less than about 30 seconds.

3. Method for preparing fuel cell electrodes which comprises
    (a) subjecting a mixture of a powdered catalytically active material including an inactive material with a powdered matrix material to a pressure ($P_1$) sufficient to effect a mechanical bonding of the powdered mixture and form a compacted mass containing relatively large interstices throughout said mass,
    (b) rapidly increasing the pressure ($P_1$) to a second pressure ($P_2$) having a value at least 5 percent greater than the initial pressure ($P_1$),
    (c) maintaining the pressure ($P_2$) on the compacted mass for a period of time sufficient to compress the outer portions of the mass adjacent surfaces normal to the pressure applied and form in said portions relatively small interstices,
    (d) releasing the pressure ($P_2$) prior to the time the entire compacted mass contains uniform relatively small interstices throughout said mass,
    (e) sintering the compacted mass, and
    (f) contacting the sintered mass with an alkali leaching solution to remove substantially all the catalytically inactive material.

4. Method in accordance with claim 3 wherein the initial pressure ($P_1$) is at least 10,000 p.s.i. for a period of time in the range of 1–15 minutes and wherein the second pressure ($P_2$) is at least 5 percent greater than $P_1$ for a period of time less than about 30 seconds.

References Cited

UNITED STATES PATENTS

| 1,510,745 | 10/1924 | Montgomery | 264—120 X |
| 3,201,282 | 7/1959 | Justi et al. | 136—86 |
| 2,837,772 | 6/1958 | Deakin | 18—59 |

WINSTON A. DOUGLAS, Primary Examiner

C. F. LE FEVOUR, Assistant Examiner

U.S. Cl. X.R.

136—120; 264—120